(12) United States Patent
Mairal et al.

(10) Patent No.: US 12,537,515 B2
(45) Date of Patent: Jan. 27, 2026

(54) SYSTEMS AND METHODS FOR SPACE VECTOR PULSE WIDTH MODULATION USING VOLTAGE OFFSETS

(71) Applicant: Hamilton Sundstrand Corporation (HSC), Charlotte, NC (US)

(72) Inventors: Palash Mairal, Jabalpur (IN); Rajkumar Sengodan, Namakkal (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 444 days.

(21) Appl. No.: 18/093,718

(22) Filed: Jan. 5, 2023

(65) Prior Publication Data
US 2023/0238945 A1 Jul. 27, 2023

(30) Foreign Application Priority Data
Jan. 8, 2022 (IN) .............................. 202241001131

(51) Int. Cl.
*H02M 7/537* (2006.01)
*H02M 1/088* (2006.01)
*H03K 3/017* (2006.01)

(52) U.S. Cl.
CPC ............ *H03K 3/017* (2013.01); *H02M 1/088* (2013.01); *H02M 7/537* (2013.01)

(58) Field of Classification Search
CPC ..... G06F 1/263; H02M 1/10; H02M 3/33561; H02M 7/003; H02M 3/1582; H02M 3/1584; H02M 3/285; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007;

(Continued)

(56) References Cited

U.S. PATENT DOCUMENTS 6,201,720 B1 * 3/2001 Tracy ................ H02M 7/53875
363/95
9,520,800 B2 * 12/2016 Tian .................... H02M 7/4833
(Continued)

FOREIGN PATENT DOCUMENTS

CN 105226985 A 1/2016
CN 105490574 A 4/2016
(Continued)

OTHER PUBLICATIONS

Ratib Mohamed K. et al: "Amplitude Sampled Reference-Based Space Vector Pulse Width Modulation for Control of Voltage Source Converters", Energy Systems Research, No. 2(14), Jul. 23, 2021 (Jul. 23, 2021), pp. 46-63, XP093044574, DOI: 10.38028/esr.2021.02.0005.

(Continued)

*Primary Examiner* — Sean Kayes
*Assistant Examiner* — Nusrat Quddus

(57) ABSTRACT

In accordance with at least one aspect of this disclosure, a method for pulse width modulation control includes resolving a reference vector for any number of active space vectors to determine a voltage offset for the reference vector, adding the voltage offset to each active vector to determine a modified modulated signal to be added to a carrier signal, and controlling, with a control module, a switching circuit based at least in part on the modified carrier signal.

20 Claims, 3 Drawing Sheets

(58) Field of Classification Search
CPC ............. H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/073; H02M 3/10; H02M 3/135; H02M 3/137; H02M 3/28; H02M 3/315; H02M 3/3155; H02M 3/325; H02M 3/335; H02M 7/515; H02M 7/521; H02M 7/53; H02M 7/537; H02M 7/5383; H02M 7/53862; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/12; H02M 7/04; H02M 7/00; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H01L 25/112; H01L 25/115; H01L 23/34; H01R 13/6675; H01R 29/00; H01R 31/065; G09G 3/20; H02K 11/046; H01F 2027/406; H05K 7/20927; H02J 3/46; H02J 3/38; H02J 3/36; H02J 3/01; H02H 7/261; H02H 7/268

See application file for complete search history.

(56) References Cited

U.S. PATENT DOCUMENTS

| | | | |
|---|---|---|---|
| 9,899,936 B2 | 2/2018 | Lee | |
| 10,498,216 B1 | 12/2019 | Lee | |
| 2007/0268728 A1* | 11/2007 | Mohan | H02M 5/297 |
| | | | 363/132 |
| 2012/0218801 A1* | 8/2012 | Yamanaka | H03K 7/08 |
| | | | 363/148 |
| 2014/0306638 A1* | 10/2014 | Wu | H02P 21/22 |
| | | | 318/504 |
| 2019/0035545 A1* | 1/2019 | Mairie | H01F 30/02 |
| 2019/0326828 A1 | 10/2019 | Fox | |
| 2024/0348049 A1* | 10/2024 | Horton | H02M 3/33584 |

FOREIGN PATENT DOCUMENTS

| | | |
|---|---|---|
| IN | 201741042315 | 2/2017 |
| WO | WO-2021183077 A1 | 9/2021 |

OTHER PUBLICATIONS

Extended European Search Report issued in corresponding EP Patent Application No. 23150356.6 on May 15, 2023.

* cited by examiner

SYSTEMS AND METHODS FOR SPACE VECTOR PULSE WIDTH MODULATION USING VOLTAGE OFFSETS

CROSS-REFERENCE TO RELATED APPLICATIONS

This application claims priority to and the benefit of Indian Patent Application No. IN202241001131 filed Jan. 8, 2022, the entire content of which is incorporated herein by reference.

TECHNICAL FIELD

This disclosure relates to pulse width modulation, and in particular to space vector pulse width modulation.

BACKGROUND

Many pulse width modulation techniques exist, including PWM technique is Space Vector PWM (SVPWM) and Sine-Triangular PWM (STPWM). Different techniques offer different advantages and may be more desirable in certain applications. For example, SVPWM may be advantageous in applications where a reduced harmonic disturbance but increased fundamental voltage at the inverter output are needed.

However, typical SVPWM techniques utilize eight vectors for generating the switching sequences, which increases the complexity as compared to the technique where PWM is generated by comparing the modulating signals with the career signal, such as in STPWM. There, remains a need in the art for improvements to SVPWM techniques that provide the advantages discussed while still maintaining a reduced computational complexity. This disclosure provides a solution for this need.

SUMMARY

In accordance with at least one aspect of this disclosure, a method for pulse width modulation control includes, resolving a reference vector for any number of active space vectors to determine a voltage offset for the reference vector, adding the voltage offset to each active vector to determine a modified modulated signal to be added to a carrier signal, and controlling, with a control module, a switching module based at least in part on the modified carrier signal.

Resolving can include, calculating an angle θ using a first and second voltage V1 and V2 at a first and second time T1 and T2, for one active sector. A voltage-time balance for the reference vector can be represented by $V_1T_1+V_2T_2+V_0T_0=V_{ref}T_s$, where $V_0T_0$ represents a null vector at T0 and a zero voltage, where $V_{ref}$ is a reference voltage, and $T_s$ is a time of sampling. Resolving can also include, calculating a horizontal component of the reference vector, along an α-axis using $$V_{ref}T_s \cdot \cos\theta = V_1T_1 + V_2T_2 \cdot \cos\left(\frac{\pi}{3}\right).$$

In embodiments, resolving can include calculating a vertical component of the reference vector, along an β-axis, using $$V_{ref}T_s \cdot \sin\theta = V_2T_2 \cdot \sin\left(\frac{\pi}{3}\right).$$

The active sampling time for all active vectors at T1 and T2 can be generalized by $$T_1 = \frac{V_s\sin\left(\frac{k*\pi}{3} - 0\right)}{\sin\left(\frac{\pi}{3}\right)} \text{ and } T_2 = \frac{V_s\sin\left(0 - (k-1)\frac{\pi}{3}\right)}{\sin\left(\frac{\pi}{3}\right)},$$

wherein k is the sector number. In embodiments, resolving can include resolving the reference vector for a number of sectors less than a total number of sectors.

In embodiments, calculating the voltage offset can be represented by $$V_{offset} = (-1)^k \times \frac{(T_1 - T_2)}{CV_s^2},$$

wherein C is a constant optimized for a maximum fundamental voltage and $(T_1-T_2)$ represents an effective time of the active vector. In embodiments, the constant C can be optimized such that a total harmonic distortion at an inverter output is minimized.

In accordance with at least one aspect of this disclosure, a control module can be operatively connected to a switching module for space vector pulse width modulation (SVPWM) control of the switching module. The control module can include computer readable instructions configured to cause the control module to, resolve a reference vector for any number of space vectors to determine a voltage offset for the reference vector, add the voltage offset to each active vector to determine a modified modulated signal to be added to a carrier signal, control the switching module based at least in part on the modified carrier signal.

In embodiments, the control module can be configured to calculate an angle θ using a first and second voltage V1 and V2 at a first and second time T1 and T2, for one sector, where a voltage-time balance for the reference vector is represented by $V_1T_1+V_2T_2+V_0T_0=V_{ref}T_s$, where $V_0T_0$ represents a null vector at T0 and a zero voltage, where $V_{ref}$ is a reference voltage, and $T_s$ is a time of sampling.

In embodiments, the control module can be configured to calculate a horizontal component of the reference vector, along an α-axis using $$V_{ref}T_s \cdot \cos\theta = V_1T_1 + V_2T_2 \cdot \cos\left(\frac{\pi}{3}\right).$$

In embodiments, the control module can be configured to calculate a vertical component of the reference vector, along an β-axis, using $$V_{ref}T_s \cdot \sin\theta = V_2T_2 \cdot \sin\left(\frac{\pi}{3}\right),$$

where an active sampling time for all active vectors at T1 and T2 is generalized by $$T_1 = \frac{V_s\sin\left(\frac{k*\pi}{3} - 0\right)}{\sin\left(\frac{\pi}{3}\right)} \text{ and } T_2 = \frac{V_s\sin\left(0 - (k-1)\frac{\pi}{3}\right)}{\sin\left(\frac{\pi}{3}\right)},$$

wherein k is the sector number.

In accordance with at least one aspect of this disclosure, a system can include a voltage input operatively connected to a load, an inverter, including a switching module operatively connected between the voltage input and the load configured to control a flow of power from the voltage input to the load, a control module operatively connected to the switching module for space vector pulse width modulation (SVPWM) control of the switching module. The control module can be configured to perform any function and/or method as described herein.

In certain embodiments, the inverter can include a two-level, three phase inverter. In embodiments, the control module can be configured to reduce common mode voltage to near zero. In embodiments, total harmonic disturbance of the system can be reduced to about 50% of fundamental in an unfiltered inverter output voltage.

In accordance with at least one aspect of this disclosure, a non-transitory computer readable medium including computer executable instructions configured to cause a computer to perform the method as described herein. In certain embodiments, the medium can include a file stored therein, the file including the computer executable instructions, wherein the computer includes a control module configured to perform the method as described herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
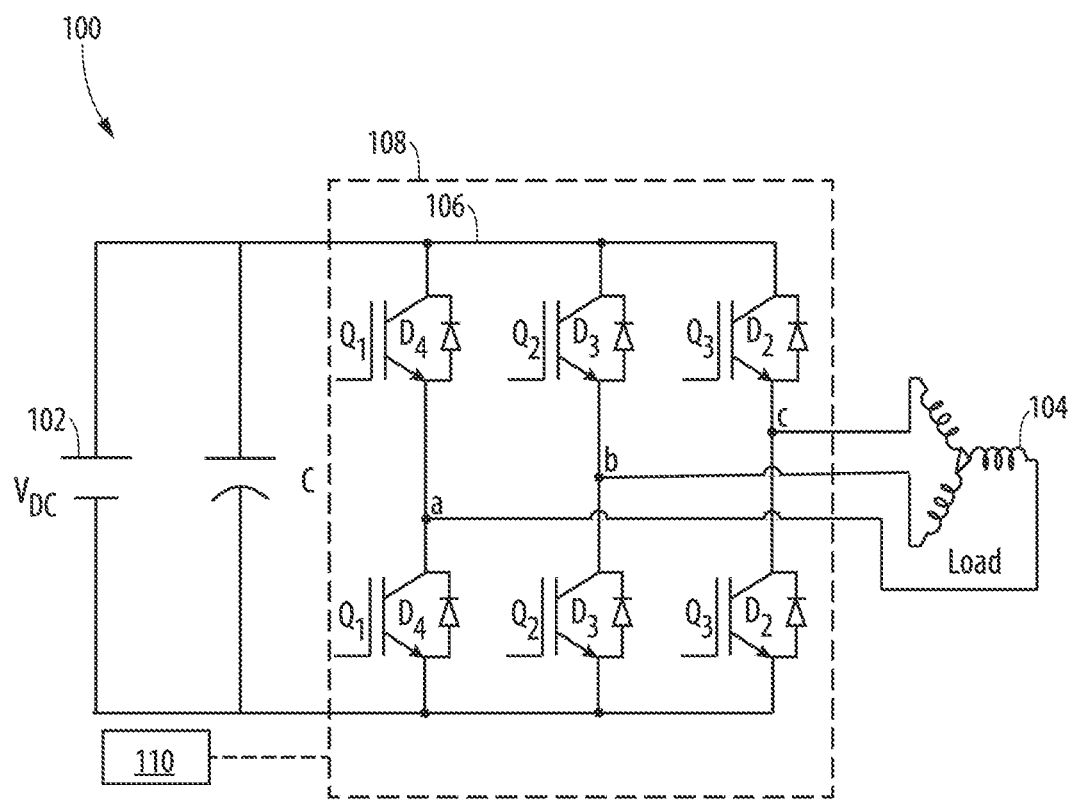
FIG. 1 is a schematic view of a system in accordance with this disclosure, showing an inverter having a switching module.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-4.

In accordance with at least one aspect of this disclosure, a system 100 can include a voltage input 102 operatively connected to a load 104, an inverter 106, including a switching module 108 operatively connected between the voltage input 102 and the load 104 configured to control a flow of power from the voltage input 102 to the load 104, and a control module 110 operatively connected to the switching module 108 for pulse width modulation (PWM) control of the switching module 108.

Figure 2:
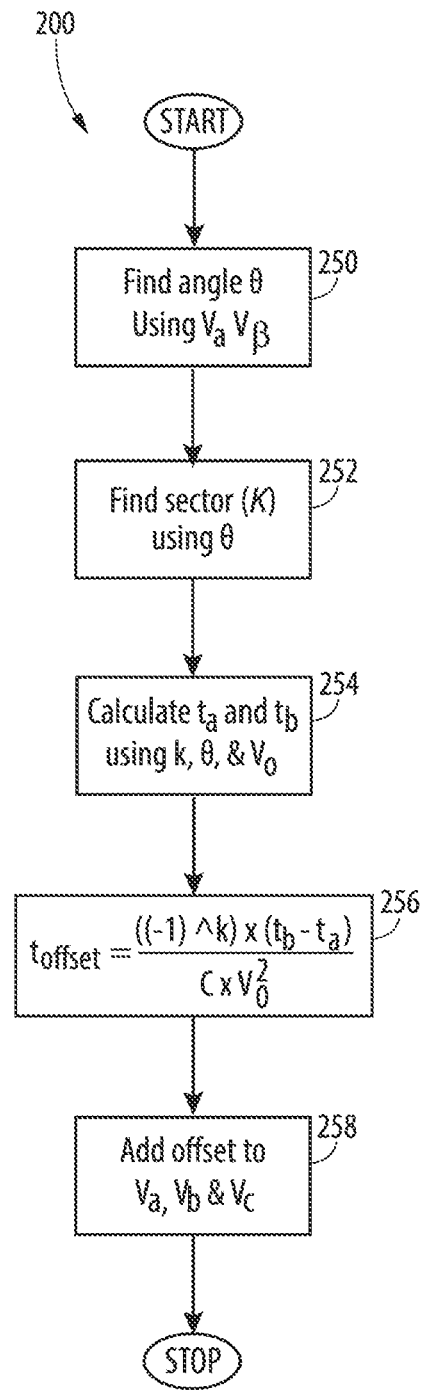
FIG. 2 is a block diagram in accordance with this disclosure, showing a method.
Figure 3:
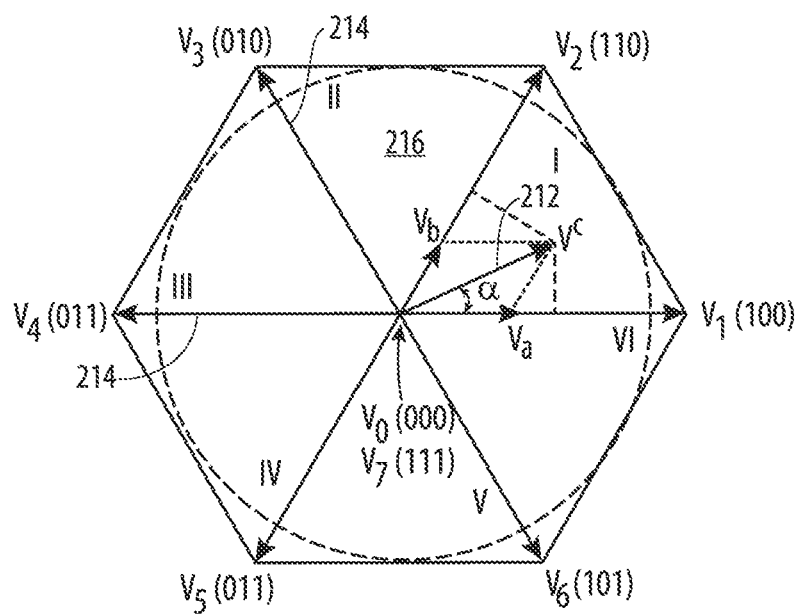
FIG. 3 is a space vector diagram in accordance with this disclosure, showing a reference vector.
Figure 4:
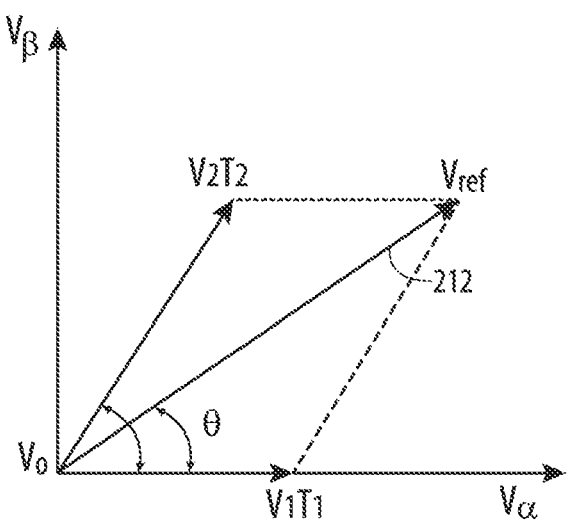
FIG. 4 is a vector diagram in accordance with this disclosure, showing resolution of the reference vector of FIG. 3.

In embodiments, the control module 110 can be configured for space vector PWM control (e.g., method 200 of FIG. 2), wherein the control module 110 includes computer readable instructions configured to cause the control module 110 to, among other things, as shown in FIGS. 3 and 4, resolve a reference vector 212 for any number of space vectors 214 to determine a voltage offset for the reference vector 212, add the voltage offset to each active vector 214 to determine a modified modulated signal to be added to a carrier signal, and control the switching module 108 based at least in part on the modified carrier signal, as described further below.

In accordance with at least one aspect of this disclosure, the method 200 for pulse width modulation control includes, resolving the reference vector 212, as shown in FIG. 2 for example, for any number of active space vectors 214 to determine a voltage offset for the reference vector 212. Resolving the reference vector can include, at block 250, calculating an angle θ using a first and second voltage V1 and V2 at a first and second time T1 and T2, for one active sector 216 (e.g., identified in roman numerals in FIG. 3).

A voltage-time balance for the reference vector can be represented by $V_1T_1+V_2T_2+V_0T_0=V_{ref}T_s$, where $V_0T_0$ represents a null vector at T0 and a zero voltage, where $V_{ref}$ is a reference voltage, and $T_s$ is a time of sampling. Calculating a horizontal component of the reference vector, along an α-axis can be achieved using $$V_{ref}T_s \cdot \cos\theta = V_1T_1 + V_2T_2 \cdot \cos\left(\frac{\pi}{3}\right)$$

and calculating a vertical component of the reference vector, along an β-axis, can be achieved using $$V_{ref}T_s \cdot \sin\theta = V_2T_2 \cdot \sin\left(\frac{\pi}{3}\right).$$

At block 252, the active sector can be determined for the calculated angle theta.

At block 254, an active sampling time for all active vectors at T1 and T2 can be calculated using generalized expressions $$T_1 = \frac{V_S \sin\left(\frac{k*\pi}{3}0\right)}{\sin\left(\frac{\pi}{3}\right)} \text{ and } T_2 = \frac{V_S \sin\left(0-(k-1)\frac{\pi}{3}\right)}{\sin\left(\frac{\pi}{3}\right)}.$$

The generalized expressions can thus be used for each active sector, where k is the sector number.

At block 256, the voltage offset can thus be calculated using the expression, $$V_{offset} = (-1)^k \times \frac{(T_1-T_2)}{CV_s^2},$$

wherein C is a constant optimized for a maximum fundamental voltage and $(T_1-T_2)$ represents an effective time of the active vector. In embodiments, the constant C can be optimized such that a total harmonic distortion (THD) at an inverter output is minimized. In certain embodiment, the constant C can be optimized for both maximum fundamental voltage and minimum THD.

Finally, at block 258, the method includes adding the voltage offset to each active vector to determine a modified modulated signal to be added to a carrier signal. The control module 110 can then control a switching module 108 based at least in part on the modified carrier signal for PWM control.

Using the method as described, resolving the reference can be performed for a number of sectors less than a total number of sectors. For example, resolving the reference vector may only need to be resolved for a single active sector, wherein the calculated voltage offset is then added to each additional sector to determine the switching sequence for SVPWM control of the switching circuit. This results is a much less computationally dense method than traditional methods.

In accordance with at least one aspect of this disclosure, a control module (e.g., module 110) can be operatively connected to a switching module for space vector pulse width modulation (SVPWM) control of the switching module. In embodiments, the control module can include computer readable instructions configured to cause the control module to perform a method, for example the method as described herein.

In embodiments, a non-transitory computer readable medium can include computer executable instructions configured to cause a computer to perform the method. In certain embodiments, a file can be stored in the non-transitory computer readable medium, or within the control module (e.g., in a memory) for example, where the file includes the computer executable instructions.

In embodiments, the inverter 104 can be or include a two-level, three phase inverter. The control module 110 can also be configured to reduce common mode voltage to near zero and reduce THD of the system to about 50% of fundamental in an unfiltered inverter output voltage. However, it is contemplated the control module and method can reduce the THD further when a filter is included, and depending on a size of the filter. It will be appreciated by those having ordinary skill in the art that inclusion of such filters and their size can be determined by the needs of the system and desired output of the inverter, which may be different for any given application.

Embodiments provide a novel implementation of space vector PWM technique for a three phase, two level inverter. Space Vector PWM can be superior to Sine-Triangular PWM (STPWM) in terms of THD & wTHD, for example, because SVPWM can allow for increased utilization of DC link voltage by 15% increased fundamental at inverter output. Moreover, embodiments can provide educed switching losses and reduction of common mode voltage.

Since the typical SVPWM strategy uses all eight vectors (e.g., for a three phase two level inverter) for generating the switching sequences, the complexity of the calculations increases as compared to the technique where PWM is generated by comparing the modulating signals with the carrier signal, such as in STPWM. However, STPWM can be even more complex when the calculations must be performed for all eight vectors. Accordingly, embodiments herein can provide the advantages of traditional SVPWM with the ease of STPWM, for example to produce the modified modulating signals to be compared with a carrier signal, without the computational expense of traditional techniques.

Typical SVPWM can utilize two different algorithms for the comparative analysis, KimSul Algorithm and Switching State Algorithm. But again, these methods are very complex and require many steps of analysis before arriving at the modified modulating signals. Such complex analysis may take longer to perform and the computer executable instructions for such analyses can take up large amounts of memory, relative to systems and methods disclosed herein.

Embodiments disclosed herein include computing an offset voltage to be added in the original modulating signals, which include the triplen harmonics. Then, the offset can be added to the original signals to get the modified modulating signals for comparison with the modulating carrier signals. This can be similar to a step of STPWM, however, by calculating the offset voltage, the reference vector need only be resolved for a single active vector. The same voltage offset can then be used for each of the remaining sectors, without requiring additional complex computation. Thus, embodiments disclosed herein can result in faster and more efficient computation, more efficient control of the switching module of the inverter, and the instructions can require much less space in the memory.

In embodiments herein, the offset voltage can be tuned for the optimization of better inverter performance. For example, the for a commonly used two-level three-phase inverter for industrial applications, maximum THD values can be up to about 150% of the fundamental voltages. However, embodiments can bring down the value of THD to about 50% of fundamental in the unfiltered inverter output voltage. In embodiments that utilize a filter, the THD values can be reduced further, and even more so depending on the size of the filter. Further, embodiments can provide a common mode voltage or zero-sequence voltage of the inverter at or near zero. Embodiments can have better digital and computational efficiency, and significantly reduced complexity.

As shown herein, e.g. with reference to FIGS. 3-4, embodiments makes use of the voltage signals $V\alpha$ and $V\beta$ already available, to find the angle $\theta$. A value of V0=0 indicates either of the null vectors. Vref in one sampling time period Ts can be obtained by turning on V1 voltage vector for T1 time & V2 voltage vector for T2 time, while the remaining is the null time T0. The reference vector can then be resolved for a single active sector, for example sector 1.

For sector 1, the reference vector for a given sampling time can be determined by calculating the horizontal and vertical components, e.g., using Volt-Sec balance and the already available $V\alpha$ and $V\beta$. Then, assuming the given sampling time is 1 per unit, solving for T1 and T2 (e.g., the active time, where no null vectors are considered), provides a generalized expression T1 and T2 for all the sectors:

$$T_1 = \frac{V_s \sin\left(\frac{k*\pi}{3} - \theta\right)}{\sin\left(\frac{\pi}{3}\right)} \text{ and } T_2 = \frac{V_s \sin\left(\theta - (k-1)\frac{\pi}{3}\right)}{\sin\left(\frac{\pi}{3}\right)},$$

as presented above. Accordingly, the value offset voltage is to be calculated by:

$$V_{offset} = (-1)^k \times \frac{(T_1 - T_2)}{CV_s^2},$$

where "C" is a constant which can be optimized for the maximum fundamental voltage and minimum THD at the inverter output, and 'k' is the sector number. In embodiments, the valve of the optimized constant C can be 2.5, for example. Finally, the offset can be added to each active vector to determine the modified modulated signals to for comparison to the carrier signals.

Embodiments as disclosed herein can have a better performance, for example with respect to THD having higher modulation index, in comparison with KimSul Algorithm and Switching State Algorithm. Additionally, embodiments can provide better performance, with a reduced LC filter size. This allows for a smaller inverter to be used, and ultimately can reduce the size and weight of the system entirely, which can be beneficial in certain applications, such as in aircraft. In embodiments, the computational complexity is reduced, where a total number of variables is minimized and the memory occupied by the code can be minimized. Moreover, the execution time for the reduced computational complexity of the method described herein is reduced.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A method for pulse width modulation control, comprising:
    resolving a reference vector for multiple active space vectors using a first voltage V1 measured at a first sampling time T1 and a second voltage V2 measured at a second sampling time T2 to determine an active sector number and a voltage offset for the reference vector based on the active sector number;
    adding the voltage offset to each active space vector to determine a modified modulated signal to be added to a carrier signal in order to generate a modified carrier signal; and
    controlling, with a control module, a switching module based on the modified carrier signal.

2. The method as recited in claim 1, wherein resolving the reference vector includes calculating an angle θ between a horizontal component and a vertical component of the reference vector using a voltage-time balance based on the first and second voltages V1 and V2 at the first and second sampling times T1 and T2 to determine the active sector number.

3. The method as recited in claim 2, wherein the voltage-time balance is represented by $V_1T_1+V_2T_2+V_0T_0=V_{ref}T_s$, where $V_0T_0$ represents a null vector at time T0 and a zero voltage, $V_{ref}$ is a reference voltage, and $T_s$ is a time of sampling.

4. The method as recited in claim 3, wherein calculating the angle θ comprises calculating the horizontal component of the reference vector along an α-axis using $$V_{ref}T_s \cdot \cos\theta = V_1T_1 + V_2T_2 \cdot \cos\left(\frac{\pi}{3}\right).$$

5. The method as recited in claim 4, wherein calculating the angle θ further comprises calculating the vertical component of the reference vector along a β-axis using $$V_{ref}T_s \cdot \sin\theta = V_2T_2 \cdot \sin\left(\frac{\pi}{3}\right).$$

6. The method as recited in claim 5, wherein the sampling times T1 and T2 are represented by $$T_1 = \frac{V_s\sin\left(\frac{k*\pi}{3} - \theta\right)}{\sin\left(\frac{\pi}{3}\right)} \text{ and } T_2 = \frac{V_s\sin\left(\theta - \frac{(k-1)\pi}{3}\right)}{\sin\left(\frac{\pi}{3}\right)},$$

wherein k is the active sector number.

7. The method as recited in claim 6, wherein the voltage offset is represented by $$V_{offset} = (-1)^k \times \frac{(T_1 - T_2)}{CV_s^2},$$

wherein C is a constant optimized for a maximum fundamental voltage and $(T_1-T_2)$ represents an effective time of an active space vector of the multiple active space vectors having the active sector number.

8. The method as recited in claim 7, wherein the constant C is optimized such that a total harmonic distortion at an inverter output is minimized.

9. The method as recited in claim 1, wherein resolving the reference vector includes resolving the reference vector for a number of sectors less than a total number of sectors.

10. A control module operatively connected to a switching module for space vector pulse width modulation (SVPWM) control of the switching module, wherein the control module includes computer readable instructions configured to cause the control module to:
    resolve a reference vector for multiple active space vectors using a first voltage V1 measured at a first sampling time T1 and a second voltage V2 measured at a second sampling time T2 to determine an active sector number and a voltage offset for the reference vector based on the active sector number;
    add the voltage offset to each active space vector to determine a modified modulated signal to be added to a carrier signal in order to generate a modified carrier signal; and control the switching module based on the modified carrier signal.

11. The module as recited in claim 10, wherein the control module is configured to calculate an angle θ between a horizontal component and a vertical component of the reference vector using a voltage-time balance based on the first and second voltages V1 and V2 at the first and second sampling times T1 and T2 to determine the active sector number.

12. The module as recited in claim 11, wherein the voltage-time balance is represented by $V_1T_1+V_2T_2+V_0T_0=V_{ref}T_s$, where $V_0T_0$ represents a null vector at time T0 and a zero voltage, $V_{ref}$ is a reference voltage, and $T_s$ is a time of sampling.

13. The module as recited in claim 12, wherein the control module is configured to calculate the angle θ by calculating the horizontal component of the reference vector along an α-axis using $$V_{ref}T_s \cdot \cos\theta = V_1T_1 + V_2T_2 \cdot \cos\left(\frac{\pi}{3}\right).$$

14. The module as recited in claim 13, wherein the control module is configured to calculate the angle θ by calculating the vertical component of the reference vector along a β-axis using $$V_{ref}T_s \cdot \sin\theta = V_2T_2 \cdot \sin\left(\frac{\pi}{3}\right).$$

15. The module as recited in claim 14, wherein the sampling times T1 and T2 are represented by $$T_1 = \frac{V_s\sin\left(\frac{k*\pi}{3}-0\right)}{\sin\left(\frac{\pi}{3}\right)} \text{ and } T_2 = \frac{V_s\sin\left(0-\frac{(k-1)\pi}{3}\right)}{\sin\left(\frac{\pi}{3}\right)},$$

wherein k is the sector number.

16. A system, comprising:
a voltage input operatively connected to a load;
an inverter including a switching module operatively connected between the voltage input and the load and configured to control a flow of power from the voltage input to the load; and
a control module operatively connected to the switching module for space vector pulse width modulation (SVPWM) control of the switching module, wherein the control module is configured to:
resolve a reference vector for multiple active space vectors using a first voltage V1 measured at a first sampling time T1 and a second voltage V2 measured at a second sampling time T2 to determine an active sector number and a voltage offset for the reference vector based on the active sector number; and
add the voltage offset to each active space vector to determine a modified modulated signal to be added to a carrier signal.

17. The system as recited in claim 16, wherein the inverter includes a two-level, three phase inverter.

18. The system as recited in claim 16, wherein the control module is configured to reduce common mode voltage to near zero.

19. The system as recited in claim 16, wherein total harmonic disturbance of the system is reduced to about 50% of fundamental in an unfiltered inverter output voltage.

20. The method as recited in claim 8, wherein the inverter includes a two-level, three phase inverter.

* * * * *